(12) United States Patent
Lavallee et al.

(10) Patent No.: US 8,367,764 B2
(45) Date of Patent: Feb. 5, 2013

(54) ACRYLIC COPOLYMER FOR USE IN HIGHLY FILLED COMPOSITES

(75) Inventors: Paul R. Lavallee, Berwyn, PA (US); Mark L. Lavach, Allentown, PA (US); Rong M. Hu, Norristown, PA (US)

(73) Assignee: Arkema Inc., King of Prussia, PA (US)

( * ) Notice: Subject to any disclaimer, the term of this patent is extended or adjusted under 35 U.S.C. 154(b) by 856 days.

(21) Appl. No.: 11/971,287

(22) Filed: Jan. 9, 2008

(65) Prior Publication Data

US 2009/0111915 A1 Apr. 30, 2009

Related U.S. Application Data

(60) Provisional application No. 60/983,612, filed on Oct. 30, 2007.

(51) Int. Cl.
  *C04B 24/26* (2006.01)
(52) U.S. Cl. ......... 524/523; 52/309.1; 52/309.13; 524/35; 524/270; 524/271; 524/272; 524/273; 524/401; 524/425; 524/437; 524/560; 524/561; 524/567; 526/328.5; 526/329.7; 526/344; 528/271; 528/397
(58) Field of Classification Search ......... 524/522, 524/35, 270, 271, 272, 273, 401, 425, 437, 524/523, 527, 560, 561, 567; 52/309.1, 309.13; 526/328.5, 329.7, 344; 528/271, 397
See application file for complete search history.

(56) References Cited

U.S. PATENT DOCUMENTS

| 4,052,482 | A | * | 10/1977 | Ide et al. .......... 525/76 |
| 5,084,501 | A | | 1/1992 | Drout et al. |
| 5,278,219 | A | * | 1/1994 | Lilley et al. ......... 524/439 |
| 6,284,839 | B1 | * | 9/2001 | Fahey et al. ........ 525/66 |
| 2008/0119604 | A1 | * | 5/2008 | Greenawalt .......... 524/522 |

FOREIGN PATENT DOCUMENTS

GB 1378434 * 12/1974

OTHER PUBLICATIONS

Ullmann's Encyclopedia of Industrial Chemistry, 5th ed., vol. A 20, pub. VCH, pp. 494-496.*
Ullmann's Encyclopedia of Industrial Chemistry, 5th ed., vol. A 20, pub. VCH, Sep. 1992, pp. 494-496.*

* cited by examiner

*Primary Examiner* — Richard A Huhn
(74) *Attorney, Agent, or Firm* — Lynn B. Morreale

(57) ABSTRACT

The invention relates to an acrylic copolymer additive useful as a process aid in highly filled polyvinyl chloride (PVC) and chlorinated polyvinyl chloride (CPVC) composites. The acrylic additive is especially useful in highly filled PVC flooring tiles, rolled flooring, pipe and siding. The acrylic copolymer additive contains from 50 to 79 weight percent of methyl methacrylate monomer units, and has a Tg of less than 90° C.

9 Claims, No Drawings

ACRYLIC COPOLYMER FOR USE IN HIGHLY FILLED COMPOSITES

CROSS-REFERENCE TO RELATED APPLICATION

This application is claims priority to provisional patent application No. 60/983,612, filed on Oct. 30, 2007, which is hereby incorporated by reference in its entirety.

FIELD OF THE INVENTION

The invention relates to an acrylic copolymer additive useful as a process aid in highly filled polyvinyl chloride (PVC) and chlorinated polyvinyl chloride (CPVC) composites. The acrylic additive is especially useful in highly filled PVC flooring tiles, rolled flooring, pipe and siding. The acrylic copolymer additive contains from 50 to 79 weight percent of methyl methacrylate monomer units, and has a Tg of less than 90° C.

BACKGROUND OF THE INVENTION

Highly filled polyvinyl chloride (PVC) is commonly used in forming PVC floor tiles and rolled flooring with very high levels of filler, often in the 75-90 weight percentage range. High levels of filler are also used in PVC composites used in pipe and siding, window and door components, fencing and other architectural components—though the levels of filler are much lower than in the flooring applications. High levels of filler are used to reduce costs, and a minimal amount of polyvinyl chloride is used to hold the filler together. The processing of these highly filled flooring composites can be difficult, and often requires expensive vinyl copolymers, such as a polyvinyl alcohol (PVA)/PVC copolymer.

U.S. Pat. No. 5,084,501 describes a highly filled PVC resin powder (60 to 95% filler) in which the filler particles are coated prior to blending with the PVC resin.

Acrylic copolymer process aids that are 80 weight percent methylmethacrylate units and 20 weight percent butyl acrylate have been use as process aids for highly filled PVC siding.

Surprisingly, it has now been found that acrylic copolymers having 80 weight percent or less of methyl methacrylate units, and lower Tgs work extremely well as process aids for highly filled PVC composites. The PVC/CPVC composites of the invention show a faster fusion, and a lower time to band.

SUMMARY OF THE INVENTION

The invention relates to a highly filled PVC or CPVC composite material comprising a flooring, comprising:
a) from 70 to 95 weight percent of one or more fillers;
b) from 1 to 15 weight percent of polyvinyl chloride or chlorinated polyvinyl chloride;
c) from 0.5 to 4 weight percent of an acrylic copolymer, wherein said acrylic copolymer comprises from 50 to 79 weight percent of methyl methacrylate units, and from 20 to 50 weight percent comprising at least one other acrylic monomer, wherein said copolymer has a Tg of less than 90° C.;
d) optionally other adjuvants;
the total adding to 100 weight percent.

The invention also relates to a pipe or siding composite material comprising a siding or pipe, comprising:
a) from 15 to 35 weight percent of one or more fillers;
b) from 50 to 95 weight percent of polyvinyl chloride or chlorinated polyvinyl chloride;
c) from 0.25 to 6 weight percent of an acrylic copolymer, wherein said acrylic copolymer comprises from 50 to 79 weight percent of methyl methacrylate units, and from 20 to 50 weight percent comprising at least one other acrylic monomer, wherein said copolymer has a Tg of less than 90° C.,
d) optionally other adjuvants;
the total adding to 100 weight percent.

DETAILED DESCRIPTION OF THE INVENTION

The invention relates to a polyvinyl chloride or chlorinated polyvinyl chloride composite having a high level of filler and an acrylic copolymer process aid.

The process aid of the invention is an acrylic copolymer. By "acrylic" "copolymer", as used herein, includes copolymers, terpolymers and other polymers containing two or more different alkyl methacrylate and/or alkyl acrylate monomer units and mixtures thereof. The copolymers may be random, block, tapered, comb, star or other polymer architecture. The alkyl methacrylate monomer is preferably methyl methacrylate (MMA), which may make up from 50 to 79 weight percent of the monomer mixture, and more preferably from 50 to 70 of the monomer mixture. The other 21 to 50 weight percent of the polymer, and preferably 30 to 50 weight percent is composed of at least one other alkyl acrylate and/or alkyl methacrylate monomer unit, and may also include other ethylenically unsaturated monomers. Other (non-acrylic) monomers useful in the copolymer composition include, but are not limited to, styrene, alpha methyl styrene, acrylonitrile, and crosslinkers may also be present in the monomer mixture. The Tg of the acrylic copolymer is less than 90° C., preferably less than 80° C., more preferably less than 70° C. In addition to the methyl methacrylate monomer units, other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. A preferred acrylic copolymer is one formed from methyl methacrylate (MMA) and butyl acrylate (BA) monomer units. In the MMA/BA copolymer, the level of MMA is 79 weight percent or less, preferably 70 weight percent or less, and the level of BA monomer units is 21 weight percent or greater, and preferably at least 30 weight percent.

The acrylic copolymer is present in the composite at a level of from 025-6.0, preferably 0.5-4.0, and more preferably 0.7 to 2.5 weight percent, depending on the end use. The acrylic copolymer should be miscible with PVC and/or CPVC. The weight average molecular weight of the acrylic copolymer is in the range of from 2 million-10 million, preferably from 3 million-8 million, and more preferably from 4.5 million-5.5 million g/mol.

The acrylic copolymer is generally formed into a powder for use in the highly filled composite. The powder may be formed by typical means, such as spray drying, drum drying, freeze drying, vacuum drying, or coagulation by physical or chemical means.

The polyvinyl chloride (PVC) or chlorinated polyvinyl chloride (CPVC) resin is of a particle size and molecular weight currently used for flooring, siding and pipe applications. The PVC or CPVC is present in the composite at a level of from 0.1 to 95 weight percent, depending on the end use of the filled PVC composite. In a flooring application the level of PVC is preferably in the range of from 1 to 15 weight percent, more preferably from 4 to 13 weight percent. By "flooring" as used herein is encompassed both hard and soft vinyl flooring, including rolled flooring, flooring tiles, and other types of PVC-based flooring.

In a siding application the level of PVC is in the range of from 71 to 93 weight percent. "Siding" as used herein includes, but is not limited to, PVC or CPVC vinyl siding, fascia, drain pipe, guttering, window and door frames, fencing, decking, and other application designed to be exposed to the environment.

In a pipe application, the level of PVC or CPVC is in the range of from 50 to 95 weight percent, and more preferably 71 to 93 weight percent. By PVC or CPVC piping is meant pipe and fittings used to transport fluids, including for hot and cold potable water, waste water, chemicals, gases and other fluid-transport operations.

"Highly filled" polyvinyl chloride composites is a term dependent on the end use of the highly filled composite. For flooring applications, the level of filler is at least 70 weight percent, and preferably at least 75 percent, and more preferably at least 80 weight percent. In a PVC or CPVC pipe or siding application, a high level of filler would be greater than 15 weight percent, and more preferably greater than 20 weight percent, and even up to 35 weight percent. Typical fillers used in PVC and CPVC vinyl flooring include, but are not limited to cellulosic fibers, calcium carbonate, rosin, limestone, aluminum trihydrate, quartz, and silica. The mean particle size of the filler is that typically used in the corresponding end-use application. In general, the mean filler particle size for siding is in the range of 0.7 to 1.5 microns, for pipe is in the range of 1 to 3 microns, and for flooring is in the range of 10 to 100 microns.

The highly filled composite may also contain other adjuvants such as dyes, colorants, UV stabilizers, anti-oxidants, pigments, heat stabilizers, accent chips, PVC homopolymer, process aids, plasticizers, lubricants, calcium stearate, polyethylene, paraffin wax, impact modifiers (especially in siding), $TiO_2$, and others as known in the art.

The PVC, acrylic copolymer, filler and other optional adjuvants may be added together and blended by means known in the art, and formed into finished product, generally by a thermal forming method such as extrusion, heat lamination, calendaring, and blow molding.

EXAMPLES

Example 1

Into a 12 liter glass reactor, equipped with a stirrer, a condenser, one feed port, a temperature probe, sitting in a temperature controlled water batch, is added 6729 g deionized water, 191.8 g sodium alkyl sulfate (30%) and 3.26 g sodium carbonate. The reaction mixture is heated to 43° C., at which point a monomer mixture of 2800 g methyl methacrylate and 1200 g butyl acrylate is fed into the reactor by batch. Then $N_2$ is purged under the liquid level for 10 min and is changed to blanket purging for the rest of the reaction. When the reaction temperature reaches 43° C. again, 62.0 g potassium persulfate solution (4%) is added. The reaction mixture is kept at 43° C. for an additional 3.5 hours, then added 26.3 g potassium persulfate solution (4%) into the reaction mixture. The reaction mixture is kept at 43° C. for an additional 2 hours, cooled to room temperature. The latex is then spray dried to get the powder product. The recovered polymer has weight average molecular weight of $8.5 \times 10^6$ g/mol, measured by Gel Permeation Chromatography with tetrahydrofuran as the solvent.

Example 2

Into a 12 liter glass reactor, equipped with a stirrer, a condenser, one feed port, a temperature probe, sitting in a temperature controlled water batch, is added 6755 g deionized water and 67.54 g sodium alkyl sulfate. The reaction mixture is heated to 45° C., at which point a monomer mixture of 2800 g methyl methacrylate and 1200 g butyl acrylate is fed into the reactor by batch. Then $N_2$ is purged under the liquid level for 10 min and is changed to blanket purging for the rest of the reaction. Then, 8.36 g solution of ferrous sulfate (0.021 g), tetrasodium salt of ethylenediamine tetraacetic acid (0.23 g) and deionized water (8.11 g) is added into the reactor mixture. When the temperature reaches 45° C. again, 18.23 g sodium formaldehyde sulfoxylate solution (10%) is added, followed by 2.50 g cumene hydroperoxide (80% active). The reaction mixture is kept at 45° C. for an additional 4 hours, cooled to room temperature. The latex is then spray dried to get the powder product. The recovered polymer has weight average molecular weight of $5.3 \times 10^6$ g/mol, measured by Gel Permeation Chromatography with tetrahydrofuran as the solvent.

Example 3

Into a 12 liter glass reactor, equipped with a stirrer, a condenser, one feed port, a temperature probe, sitting in a temperature controlled water batch, is added 5670 g deionized water, 4.17 g $Na_2CO_3$ and 62.53 g sodium alkyl sulfate. The reaction mixture is heated to 40° C., at which point a monomer mixture of 3126.24 g methyl methacrylate, 833.68 g butyl acrylate and 208.4 g styrene is fed into the reactor by batch. Then $N_2$ is purged under the liquid level for 10 min and is changed to blanket purging for the rest of the reaction. Then, 84.16 g solution of metabisulfite (4.8%) and deionized water (20 g) are added into the reaction mixture. When the temperature reaches 40° C. again, 126.26 g potassium persulfate (5%) and deionized water (20 g) are added. The polymerization continues for 60 min more after the exothermic peak, cooled to room temperature. The latex is then spray dried to get the powder product. The recovered polymer has weight average molecular weight of $5.3 \times 10^6$ g/mol, measured by Gel Permeation Chromatography with tetrahydrofuran as the solvent.

| Sample | Composition | Mw, g/mol | Tg, ° C. (DMA) |
| --- | --- | --- | --- |
| 1 | MMA/BA 70/30 | $8.4 \times 10^6$ | 82 |
| 2 | MMA/BA 70/30 | $5.3 \times 10^6$ | 86 |
| 3 | MMA/BA/St 75/20/5 | $5.3 \times 10^6$ | 94 |

What is claimed is:
1. Composite material comprising a highly filled flooring, comprising:
   a) from 70 to 95 weight percent of one or more fillers, at least one filler selected from the group consisting of cellulosic fibers, calcium carbonate, rosin, limestone, aluminum trihydrate, silica and quartz;

b) from 1 to 15 weight percent of polyvinyl chloride or chlorinated polyvinyl chloride;
c) from 0.5 to 4 weight percent of an acrylic copolymer, wherein said acrylic copolymer comprises from 50 to 79 weight percent of methyl methacrylate units and from 20 to 50 weight percent of at least one other acrylic monomer unit, wherein said copolymer has a Tg of less than 90° C., and wherein said acrylic copolymer has a weight average molecular weight of from 2 million to 10 million; and
d) optionally other adjuvants;
the total adding to 100 weight percent.

2. The composite material of claim 1, wherein said acrylic copolymer comprises from 50 to 75 weight percent of methyl methacrylate units, and from 25 to 50 weight percent of at least one other acrylic monomer unit.

3. The composite material of claim 1, wherein said acrylic copolymer comprises from 50 to 70 weight percent of methyl methacrylate units, and from 30 to 50 weight percent of at least one other acrylic monomer unit.

4. The composite material of claim 1, wherein said acrylic copolymer comprises methyl methacrylate and butyl acrylate.

5. The composite material of claim 1, comprising 3.5 to 7 weight percent of polyvinyl chloride or chlorinated polyvinyl chloride.

6. The composite material of claim 1, comprising 0.7 to 2.5 weight percent of said acrylic copolymer.

7. The composite material of claim 1, wherein said acrylic copolymer has a Tg of less than 80° C.

8. The composite material of claim 1, wherein said acrylic copolymer has a Tg of less than 70° C.

9. The composite material of claim 1, wherein said acrylic copolymer has a weight average molecular weight of from 4.5 million to 5.5 million.

\* \* \* \* \*